SERIAL MEMORY

Filed Oct. 29, 1954 2 Sheets-Sheet 1

INVENTORS
KUN LI CHIEN
CHARLES H. PROPSTER, JR.
BY
Morris B. Rabkin
ATTORNEY

Sept. 29, 1959 KUN LI CHIEN ET AL 2,907,005

SERIAL MEMORY

Filed Oct. 29, 1954 2 Sheets-Sheet 2

INVENTORS
KUN LI CHIEN
CHARLES H. PROPSTER, JR.
BY Morris A. Rabkin
ATTORNEY

United States Patent Office 2,907,005

Patented Sept. 29, 1959

2,907,005

SERIAL MEMORY

Kun Li Chien and Charles H. Propster, Jr., Haddonfield, N.J., assignors to Radio Corporation of America, a corporation of Delaware Application October 29, 1954, Serial No. 465,666

13 Claims. (Cl. 340—174)

This invention relates to digital information handling systems, and particularly to an information storage system that may be used to convert information rates.

Generally, in an electronic digital computer, the information that is handled by the input and output devices of the computer is in sequential form. Difficulties arise in transferring information from one device to the other, because the rates at which the input and output devices can handle information may vary considerably. For example, an electric typewriter can print successive characters at a rate of about ten per second, while the sequential information rate for magnetic tape may be of the order of a thousand times faster. Notwithstanding this large discrepancy in information rates, it is often desirable to transfer information from one device to another as for instance, from an electric typewriter to magnetic tape. Another aspect of the problem is that the information rates of these computer devices generally are not uniform. Therefore, these devices cannot be synchronized to a common timing reference. For example, if the input device is a typewriter, a variable information rate results from the extra time required for such operations as carriage return and case shift.

In high-speed information handling machines, information storage on magnetic tape is often used, because such tape provides a compact storage for very large masses of information, and the stored information can be read from the tape at fairly high speeds. A manually-operated device, such as a typewriter, or other low-speed electromechanical or electrical device may be employed for writing the information on the tape. Such writing from typewriter to tape has been done by operating the tape reeling mechanism in discrete steps with each operation of the typewriter keyboard. In order to increase the total storage capacity of the tape, it has been found desirable to provide close packing of signals on the tape, of the order of 100 pulses per inch and higher. The mechanical problem of stepping tape as short a distance as one one-hundreth of an inch or less is a difficult one, and it becomes more difficult as closer pulse packing is attempted.

Accordingly, it is among the objects of this invention to provide:

A new and improved system for transferring information between information handling devices that operate at different rates;

A new and simple information rate converting system that permits transfer of information at optimum speeds;

A new and improved serial memory system that may be used as an information rate converter;

A new and improved serial memory system that may be used to transfer information from an electromechanical device to magnetic tape and permit close information packing on the tape;

A new and simple serial memory system that is reliable and economical in construction.

In accordance with this invention a serial memory system is employed for transferring information between information handling devices that have different information rates. A cyclic memory, such as a continuously rotating magnetic drum, receives the information from a low-speed device and transfers the information at a higher speed to a high-speed device. A plurality of parallel channels on the drum magnetically store the information signals serially around the drum. Another parallel drum channel is employed for storing time pulses each of which identifies a corresponding storage location in the information channels and clocks the operations of a memory control system. Means are provided for identifying the first of the time pulses. Combinations of information signals from the low-speed device are written in the information channels in sequence under the control of a means which receives a first enabling signal when the first time pulse is identified and a second enabling signal only when the next empty information storage location in sequence is available to receive the information signals. The stored information signals may be read out of the information channels in a burst at the speed of the high-speed device.

The foregoing and other objects, the advantages and novel features of this invention, as well as the invention itself both as to its organization and mode of operation, may be best understood from the following description when read in connection with the accompanying drawing, in which like reference numerals refer to like parts and in which.

Figure 1:
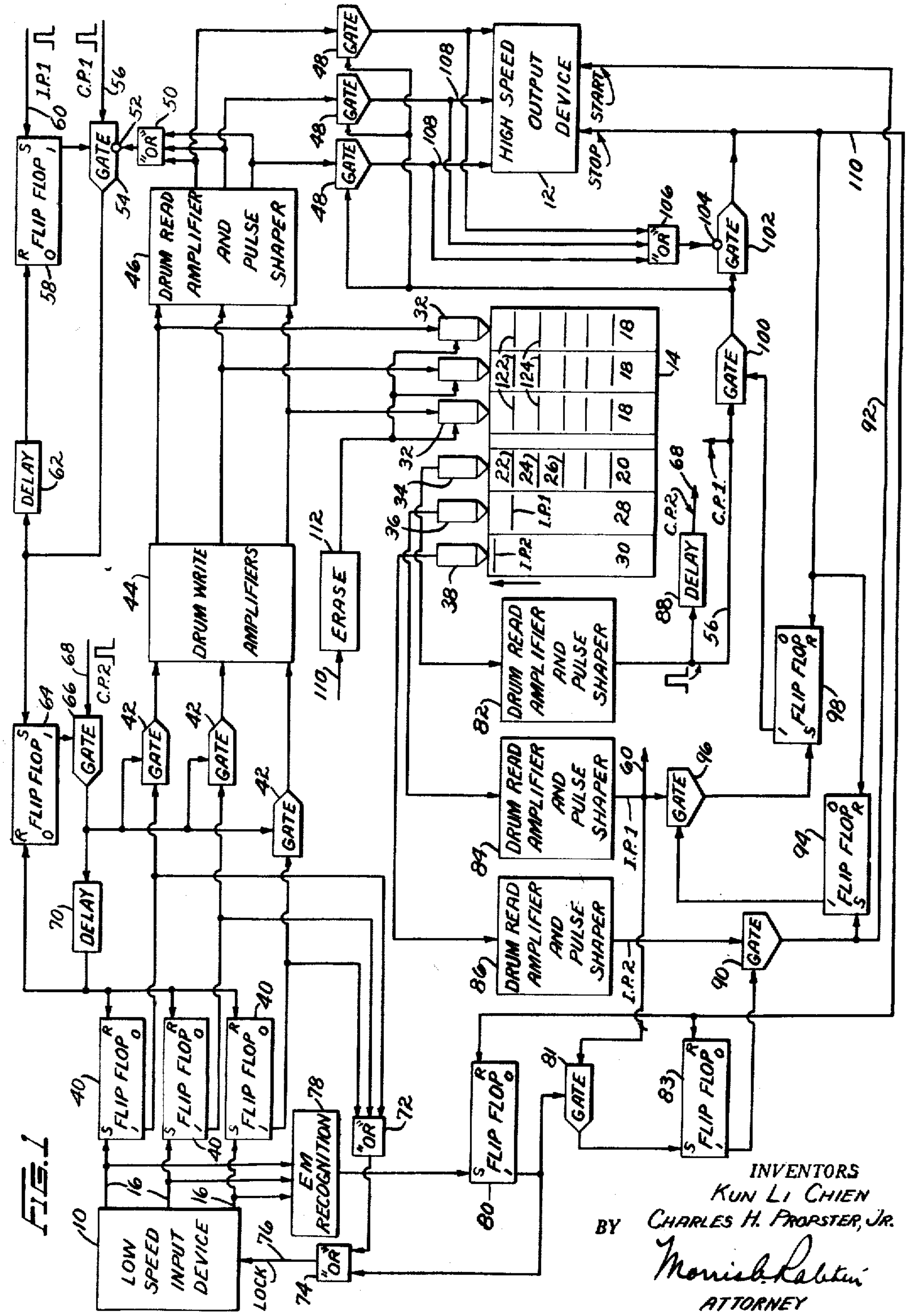
Figure 1 is a schematic block diagram of a serial memory system and information rate converter embodying this invention.

Referring to Figure 1, at the left there is shown an input device 10 which may be considered as operating at relatively low speeds. At the right is an output device 12 which operates at relatively high speeds. A serial memory 14 and control system therefor, is employed for transferring the information from the low speed input device 10 to the high speed output device 12 at rates compatible to both.

The input device 10 may be an electromechanical device such as a manually-operated electrical typewriter or perforated-tape reader. Such a typewriter may incorporate a coder (not shown) which supplies different signal combinations on a plurality of output channels 16 in accordance with the particular typewriter key that is depressed. Where a perforated tape reader is employed, it operates to supply coded signal combinations on the output channels 16. The signals may take the form of a pulse and the absence of a pulse. The combination of signals occurring at the same time in parallel channels 16 form a coded information character.

The output device 12 may be a magnetic-tape recording station, into which the information may be read intermittently in bursts and at a high rate. The serial memory 14 is shown as a cyclic magnetic drum which has a magnetizable surface and is continuously rotated in the direction shown by the arrow. A plurality of parallel channels 18 around the periphery of the drum 14 are employed for storing the information signals. The drum surface may be uniformly magnetized in one direction to represent the absence of a pulse, and small areas magnetized in the opposite direction may represent a pulse. Three information channels are shown throughout Figure 1 by way of illustration.

Figure 2:
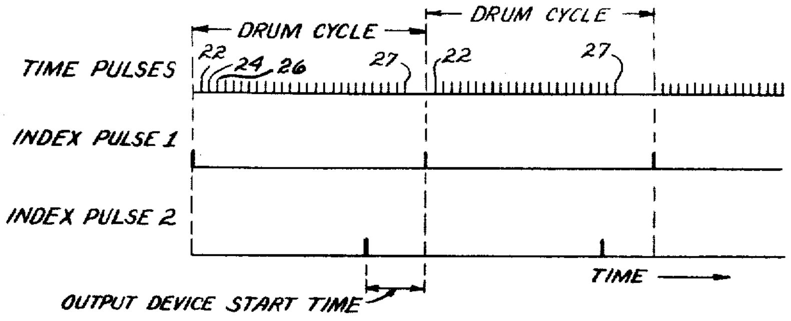
Figure 2 is an idealized timing graph showing the relative occurrences of different pulses read from a magnetic drum employed in the system of Figure 1.

A fourth channel 20 on the drum is used for storing time pulses 22, 24, 26. The time pulses 22, 24, 26 are uniformly spaced about most of the periphery of the drum in serial order starting with the first time pulse 22. A fifth drum channel 28 is used for storing a single index pulse (IP1). This IP1 is positioned to be read at substantially the same time as the first time or clock pulse 22 or slightly in advance of it. The relationship of the first time pulse 22 and IP1 is shown graphically in Figure 2. There is a gap in channel 20 between the last pulse 27 and the first pulse 22 in which no time pulses are written. IP1 may be located to occur at any time within that gap. A sixth drum channel 30 is used for storing a second index pulse (IP2) which is located to be read somewhat in advance of IP1 as shown in Figure 2. Separate read-write heads 32, 34, 36, 38 are mounted adjacent the drum channels 18, 20, 28, 30, respectively and aligned in any appropriate manner to read a line of signals extending along the length of the drum 14 in predetermined time relationships discussed below.

The information channels 16 from the input device 10 are connected to the set sides of separate flip-flops 40 which together form a temporary storage register. Each flip-flop 40 is a bistable trigger circuit having two input terminals designated S (set) and R (reset) and two output terminals designated "1" and "0". Application of a signal to the S terminal sets the flip-flop circuit 40 with its 1-output established at a relative high voltage level and its 0-output low. Application of a signal to the R terminal resets the trigger circuit in the reverse condition. The 1-outputs of the register flip-flops 40 are connected to inputs of separate two-input "and" gates 42. The outputs of the gates 42 are connected to separate drum write amplifiers 44 (three amplifiers being shown as a single block). The amplifiers 44 are connected to the read-write heads 32 for the information channels 18. These heads 32 are also connected to separate drum read amplifiers 46 (shown as a single block). The read amplifiers 46 are connected through separate two-input "and" gates 48 to the output device 12.

The outputs of the read amplifiers 46 are also applied to an "or" gate 50 which has its output connected to the inhibit terminal 52 of a 3-input "and" gate 54. A first clock pulse (CP1) on channel 56 is applied to another input of the gate 54. The third input of the gate 54 receives an enabling voltage from the 1-output of a flip-flop 58 that is set by IP1 on channel 60. The output of the gate 54 is applied through a delay line 62 to the reset side of the flip-flop 58 and, also, directly to the set side of another flip-flop 64. The 1-output of the flip-flop 64 is applied to an input of a two-input "and" gate 66 which receives as its second input a second clock pulse (CP2) on channel 68. The output of the gate 66 is applied directly to the other inputs of the three input gates 42. The output of the gate 66 is also applied through a delay line 70 to the reset sides of the flip-flop 64 and of the register flip-flops 40.

The 1-outputs of these register flip-flops 40 are applied to an "or" gate 72 the output of which is connected through another "or" gate 74 to a channel 76 which applies a "lock" signal to the input device 10. The "lock" signal may be employed to energize a relay (not shown) in the input device 10 to open a power-supply switch (not shown) or otherwise prevent operation of the input device 10 for the duration of the "lock" signal. The information channels 16 from the input device 10 are also connected to an end-of-message (EM) recognition gate 78. The EM recognition gate 78 recognizes a special coded signal combination representing the last character in a group and generates a pulse which is applied to the set side of a flip-flop 80. The 1-output of this flip-flop 80 is connected through the "or" gate 74 to the "lock" channel 76 of the input device 10. The 1-output of this flip-flop 80 is also applied to a two-input "and" gate 81, the output of which is applied to the set side of a flip-flop 83.

Each of the other read-write heads 34, 36, 38, is connected to a different drum read amplifier and pulse shaper 82, 84, 86, respectively. The output of the pulse shaper 82 for the time-pulse channel 20 is CP1 on channel 56 which is connected to a delay line 88 to provide CP2 on channel 68. The output of pulse shaper 86 is IP2 which is applied to a two-input "and" gate 90 that receives as its other input the 1-output from flip-flop 83. The output of the gate 90 on channel 92 is employed as a "start" signal for the output device 12. This "start" signal is also employed as a "set" signal for a flip-flop 94, the 1-output of which is applied to a two-input "and" gate 96. The other input of this gate 96 is IP1 from pulse shaper 84. The output of the gate 96 sets a flip-flop 98 to provide an enabling voltage from its 1-output to a two-input "and" gate 100 which also receives CP1. The output of the gate 100 is applied to the other inputs of the output gates 48 and also to another two-input "and" gate 102. The other input of this gate 102 is an inhibit input 104 that receives the output from an "or" gate 106. The information from the "and" gates 48 to the input device 12 also is brought into information channels 108 which are connected to the three input "or" gate 106. The output of the "or" gate 102 is a stop signal on channel 110 which is applied to the output device 12. This "stop" signal is employed as a reset signal for the flip-flops 98, 94, 83 and 80. This same signal on channel 110 is an "erase" signal that is applied to an erase current generator 112 which in turn applies a direct current to the write heads 32 of the information channels 18 to magnetize the drum surface of those channels 18 uniformly in one direction.

Figure 3:
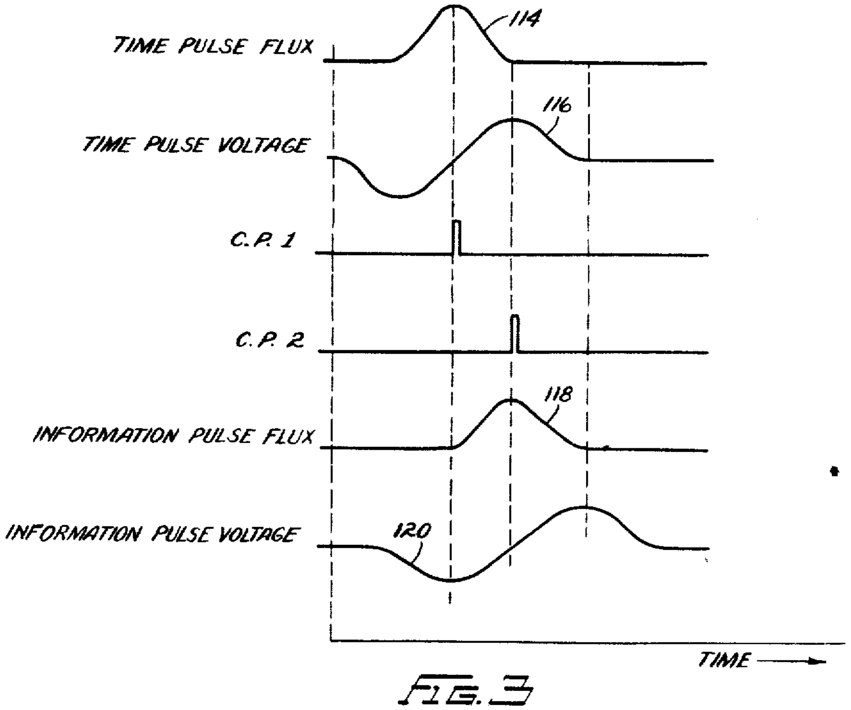
Figure 3 is an idealized graph showing the relationship of waveforms occurring at different portions of the system of Figure 1.

Shown graphically in Figure 3 is the idealized flux waveform 114 for each time pulse 22, 24, 26, 27. This flux waveform 114 represents the intensity of magnetization of a pulse along the channel 20 around the drum surface. The idealized waveform 116 of the voltage induced in the read head 34 is the time derivative of the flux waveform 114, and has a negative-going portion during the first half-period and a positive-going portion during the second half-period. The pulse shaper 82 generates CP1 from the positive-going portion of the voltage waveform 116 at the beginning of the second half-period. CP2 occurs after CP1 at a time determined by delay line 88. The flux and voltage waveforms 118 and 120, respectively, for information pulses in channels 18 are the same as the time pulses except for the time of occurrence which is discussed below.

Initially all of the information channels 18 are erased and all the flip-flops reset. An auxiliary push-button switch (not shown) may be provided for applying the appropriate signals to the various flip-flops and erase generator 112. It is assumed for the purpose of this embodiment of the invention that each information character includes at least one pulse in the signal combination. When an information character is supplied to the information channels 16 from the input device 10, such as by manual depression of one of the typewriter keys, this character is stored in the register flip-flops 40 with at least one of these flip-flops 40 being set. Accordingly, a high voltage signal from the 1-output of the set flip-flop 40 is applied through the "or" gates 72, 74 to the "lock" channel 76. The input device 10 is then held locked against further operation until the register flip-flops 40 are reset. With manual operation of a relatively slow input device 10, such as a typewriter, at a slower rate than the rate of rotation of the drum 14, this locking feature is a valuable safety feature, though not necessary for ordinary operation.

When the index pulse in channel 28 is read by the head 36, IP1 is generated to set the flip-flop 58 and apply an enabling voltage to gate 54. At about the same time, the first time pulse in channel 20 is read and CP1 is applied to gate 54. There is no information stored in the drum information channels 18 at this time, and, therefore, there are no pulses applied through the "or" gate 50 to the inhibit terminal 52 of the gate 54. Accordingly, the gate 54 is open, and CP1 is passed to set flip-flop 64 and, after a short delay, reset flip-flop 58. When the flip-flop 64 is set, gate 66 is open to pass CP2 to the input gates 42. As a result, the information character stored in the register flip-flops 40 is passed by the input gates 42, amplified and applied to the write heads 32 of the information channels 18. The write heads 32 are energized at substantially the same time that CP2 occurs. Thus, the first information character 122 is written on the drum a small distance behind the first time pulse 22 in channel 20, which distance corresponds to the delay between CP1 and CP2 as shown in Figure 3. A short time after the input gates 42 are opened, determined by delay line 70, the register flip-flops 40 and flip-flop 64 are reset. The "lock" signal is then removed from channel 76 and the second information character may be supplied by the input device.

The second character is stored in the register flip-flops 40 in the same manner. Upon the next reading of IP1, flip-flop 58 is set again. As CP1 for the first time pulse 22 is generated, the first character 122 is being read, and the negative-going portion of the information-pulse voltage wave 120 (Figure 3) is induced in at least one of the heads 32. This negative-going voltage is applied as a negative pulse through "or" gate 50 to the inhibit terminal 52 of gate 54 to hold that gate closed to CP1 of the first time pulse 22. As a result flip-flop 64 remains reset, gate 66 remains closed to CP2 of the first time pulse and the input gates 42 remain closed. When the second time pulse 24 is read, there is no information character stored in the corresponding locations in channels 18, and, therefore, a negative inhibit pulse for gate 54 is not generated. Gate 54 is, therefore, open and CP1 of the second time pulse 24 is passed to set flip-flop 64. Accordingly, the gate 66 is opened to pass CP2 to the input gates 42. Thus, the second information character 124 is written in a location in the information channels 18 corresponding to the second timing pulse 24. In a similar manner, succeeding information characters are written in the drum channels in serial order in locations corresponding to the timing pulses of the same order.

Flip-flop 58, when set by IP1, provides an enabling voltage for the gate 54 only until the first empty storage location in channels 18 passes heads 32. At that time, the gate 54 is opened to the CP1 of the corresponding time pulse. This CP1 resets flip-flop 58 to close gate 54 to the CP1's generated during the remainder of the same drum cycle. Thus, only one information character may be written in the drum 14 during each drum cycle. If an information character is not stored in register 40 upon the passing of a CP2 by gate 66, there is nothing written in the drum channels 18 during that drum revolution. A character cannot be written out of sequence in channels 18, because flip-flop 58 is not set, and gate 54 is not open after the first available empty storage location has passed the heads 32. Where it is desired to write more than one character per drum revolution, and the input device 10 can supply the characters at an appropriate rate, gate 66 is held open by a flip-flop (not shown) to pass successive CP2's. When the input device 10 has completed supplying the desired number of characters, the input device 10 or other auxiliary apparatus generates a reset signal for flip-flop 64. An example of such an input device is described in the copending patent application filed concurrently herewith, entitled "Information Storage System" Serial No. 465,586, filed October 29, 1954, by the same applicants as this application.

When a last information character of a message or of a group of characters is supplied from the input device 10, this character is written on the drum channels 18 in the manner described. This last character may be a special code signal that is recognized by the EM recognition gate 78. The gate 78 generates a pulse that sets flip-flop 80. The 1-output of flip-flop 80 is applied to channel 76 to lock the input device for the duration of the read out operation which is now described.

The 1-output of flip-flop 80 opens gate 81 to pass IP1 and set flip-flop 83. The 1-output of this flip-flop 83 opens gate 90 to pass the next IP2 which is applied to the output device 12 as a start signal. IP2 also sets flip-flop 94 which in turn opens gate 96 to IP1 at the start of the next drum cycle. As may be seen from the graph of Figure 2, IP2 is read somewhat in advance of IP1 to provide a time period for the output device 12 to "get ready" after receiving the "start" signal (IP2). Where the output device 12 is a magnetic tape station, the time between the reading of IP2 and IP1 may be the time required for reeling the tape to full speed from a stationary condition. Thus, as IP1 is passed by gate 96 to start the read-out drum cycle, the tape is running at full speed to provide close pulse packing.

IP1 is passed by gate 96 to set flip-flop 98, which in turn opens gate 100. The successive CP1's, starting with the one associated with the first time pulse 22, are passed by gate 100 and applied to the output gates 48. The information characters being read from the drum channels 18 are fed through the output gates 48 to the output device 12 one after the other starting with the first character 122 in a single revolution of the drum 14. Each character passed through the output gates 48 includes at least one negative-going pulse that is applied through "or" gate 106 to the inhibit terminal 104 of gate 102. As a result, as long as information characters are being read out to the output device 12 this gate 102 is held closed. When the last character has been read out, the gate 102 is no longer inhibited, and the next CP1 is passed to channel 110 to stop the output device 12. This stop signal resets the flip-flop 98, 94, 83 and 80 and also applies an erase signal to the current generator 112 to erase all the information on the drum channels 18. Once flip-flop 80 is reset, the input device 10 in unlocked, and the next series of characters may be written in the drum channels 18. The write-in and read-out cycles described above are then 'epeated.

To summarize, information in a predetermined sequence is supplied intermittently by the input device 10 in single units or in groups of units each of which includes fewer units than the capacity of the drum 14. These groups of information units are written in the drum 14 during different revolutions with the sequence of storage for all the information being the same as the information sequence from the source. After a desired number of information units are written in the drum 14, the read-out operation is initiated. The information is read out of the drum in a burst and in the proper sequence starting with the first information unit that was written in.

A description of an appropriate form of magnetic drum may be found in the book "High Speed Computing Devices" McGraw-Hill, 1950, page 322. Appropriate forms of gate circuits are described in the article "Diode Coincidence and Mixing Circuits" by Tung Chang Chen in Proc. of IRE, May 1950, page 511. The flip-flops may be any bistable multivibrator such as the Eccles-Jordan trigger circuit. The pulse shapers may be any monostable multivibrator. A suitable code recognition gate is described in the Patent No. 2,648,829, Ayres et al., issued August 11, 1953.

The EM recognition gate 78 may be replaced by a counter (not shown) where, for example, the information is conveniently broken up in groups of uniform size. Such a counter would terminate the write-in operation and initiate the burst read out of the drum. The read-out operation may also be initiated by a push-button (not shown).

It is evident from the above description of this invention that a new and improved serial memory system is provided for transferring information between information handling devices that operate at widely different rates. The information transfer is nonsynchronous and takes place at an optimum speed. The serial memory system transfers the information in the same order in which it is received. The apparatus employed is reliable and economical.

What is claimed is:

1. A serial memory system comprising a plurality of parallel channels for storing coded signal combinations, each of said channels having a series of signal storage locations, means for writing signals in said channels in a predetermined order and for reading out said written signals from said channels, means for applying to said writing means a signal combination to be written in said channels in corresponding locations thereof, and means responsive to any signal combination read from any one of said channel locations for inhibiting said signal applying means from applying a signal combination to be written at that same one corresponding channel location.

2. A serial memory system as recited in claim 1 wherein said signal responsive means includes means responsive to the condition that a signal combination is not being read from said channel locations for enabling said signal applying means.

3. In combination with input means for intermittently supplying information units in a predetermined sequence and in groups of one or more units, a serial memory system comprising a cyclic memory having a predetermined capacity per cycle greater than the number of units in any of said groups, means for writing said information units into said memory in said sequence with each of said groups being written in during a different cycle of said memory, means for reading signals out of said memory, supply control means responsive to the presence of signals in said memory for inhibiting the supply of information to said writing means, and means for regulating said reading means to read out said written-in signals during a single cycle of said memory.

4. A serial memory system comprising a cyclic memory including a plurality of parallel information channels for separately storing signals in a serial order, means for simultaneously writing signals of a corresponding order in said channels and for simultaneously reading signals of a corresponding order out of said channels, means for applying to said writing means information signals to be written in said channels in locations of a corresponding order, and means responsive to a signal read from at least one of said corresponding order channel locations for inhibiting said signal applying means from applying an information signal to be written at that same said corresponding order channel location, and responsive to the absence of any signals read from said corresponding order channel locations for enabling said signal applying means to apply an information signal to be written at that same said corresponding order channel location.

5. A serial memory system comprising a cyclically movable member having a magnetizable surface, a first timing channel and a plurality of second information channels each extending along said surface in the direction of movement of said member for magnetically storing signals in a predetermined order with each of said second channel signals having a predetermined time relationship to a first channel signal of corresponding order, means for simultaneously reading signals of a corresponding order from said channels in a predetermined time relationship, means for writing signals in said second channels, and means responsive to a signal read from said first channel as an enabling signal and to the absence of any signals in said second channels in locations of order corresponding to that of said enabling signal for enabling the writing of signals in said enabling signal corresponding order locations, and responsive to a signal read from any one of said corresponding order locations in said second channels for inhibiting the writing of signals in corresponding order locations.

6. A serial memory system as recited in claim 5 and further comprising a third index channel extending along said surface in the direction of movement of said magnetizable member for magnetically storing a signal having a predetermined time relationship to a first one of said first channel signals, and means for reading said third channel signal, said means for enabling the writing of second channel signals being operative only upon the reading of said third channel signal.

7. An information rate converting system for an input and an output device operating in accordance with different information rates, said converting system comprising a cyclically movable member having a magnetizable surface, a first timing channel and a plurality of second information channels each extending along said surface in the direction of movement of said member for magnetically storing signals in a predetermined serial order, means for writing signals from said input device in said second channels, said second channel signals being of first and second types, means for reading signals of corresponding order from said channels in a predetermined time relationship and at said output device information rate, and means for controlling said writing means to write signals in said second channels at said input device information rate, said controlling means including means responsive to said second channel first and second signals for respectively producing a first enabling signal and an inhibiting signal, means for producing a second enabling signal upon the reading of a predetermined one of said first channel signals, and means responsive to said first and second enabling signals and to said first channel signals for transmitting said input device signals to said writing means and responsive to said inhibiting signals for preventing transmission of said input device signals to said writing means.

8. An information rate converting system for an input and an output device operating in accordance with different information rates, said converting system comprising a cyclically movable member having a magnetizable surface, a first channel, and a plurality of other channels each extending along said surface in the direction of movement of said member for magnetically storing signals in a predetermined serial order, means for writing signals from said input device in said other channels, said other channel signals being of first and second types, means for reading signals of corresponding order from said channels in a predetermined time relationship and at said output device information rate, and means for controlling said writing means to write signals in said other channels at said input device information rate, said controlling means including means responsive to said other channel first and second signals for respectively producing a first enabling signal and an inhibiting signal, means for producing a second enabling signal upon the reading of a predetermined one of said first channel signals, and means responsive to said first and second enabling signals and to said first channel signals for transmitting said input device signals to said writing means and responsive to said inhibiting signals for preventing transmission of said input device signals to said writing means, said output device being operative to receive information at a predetermined time delay after receiving an actuating signal, said system further comprising an additional channel extending along said surface in the direction of movement of said magnetizable member for magnetically storing a signal, means for reading said additional channel signal in advance of the reading of said predetermined first channel signal a predetermined time not less than said output device time delay, and means responsive to said additional channel signal for applying an actuating signal to said output device.

9. An information rate converting system as recited in claim 7 wherein said means for producing a second enabling signal includes a third index channel extending along said surface in the direction of movement of said magnetizable member for magnetically storing a signal having a predetermined time relationship to a first one of said first channel signals, and means for reading said third channel signal.

10. An information rate converting system as recited in claim 9 wherein said means for producing a second enabling signal further includes a flip-flop, and wherein said means for transmitting said input device signals to said writing means includes a first gate means connected to receive said second enabling signal from said flip-flop, said first enabling signal and said inhibiting signal and said first channel signals, and a second gate means connected to the output of said first gate means for transmitting and blocking said input device signals.

11. A serial memory system comprising a plurality of parallel channels for storing coded signal combinations, each of said channels having a series of cyclically repeated signal storage locations, means for writing signals in said channels in a predetermined order and for reading out said written signals from said channels, means for applying to said writing means a signal combination to be written simultaneously in said channels in corresponding locations thereof, means responsive to a signal combination read simultaneously from corresponding said channel locations for inhibiting said signal applying means, and means for enabling said reading out means for reading out the contents of said memory in one of the cycles of said channels.

12. A serial memory system comprising a cyclic memory including a plurality of parallel channels for separately storing signals in a serial order, means for writing simultaneously the signals of a corresponding order in said channels and for simultaneously reading signals of a corresponding order out of said channels, means for applying to said writing means the signals to be written in said channels in locations of a corresponding order, means responsive to a signal read from at least one of said corresponding order channel locations for inhibiting said signal applying means and responsive to the absence of any signals read from said corresponding order channel locations for enabling said signal applying means, and means for regulating said reading means to read out said written-in signals during a single cycle of said memory.

13. A serial memory system comprising a cyclically movable member having a magnetizable surface, a first channel and a plurality of second channels each extending along said surface in the direction of movement of said member for magnetically storing combinations of signals in a predetermined order with each of said second channel signals having a predetermined time relationship to a first channel signal of a corresponding order, means for simultaneously reading signals of corresponding order from said channels in a predetermined time relationship, means for simultaneously writing signals in said second channels, means responsive to a signal read from said first channel as an enabling signal and to the absence of any signals in locations in said second channels of order corresponding to that of said enabling signal for enabling the writing of signals in said enabling signal corresponding order locations and responsive to a signal read from at least one of said enabling signal corresponding order locations in said second channels for inhibiting the writing of signals in said enabling signal corresponding order locations, and means for regulating said reading means to read out said written-in signals during a single cycle of said member.

References Cited in the file of this patent

UNITED STATES PATENTS

| | | |
|---|---|---|
| 2,439,446 | Begun | Apr. 13, 1948 |
| 2,614,169 | Cohen | Oct. 14, 1952 |
| 2,729,803 | Harrison | Jan. 3, 1956 |

OTHER REFERENCES

Publication I: "Review of Input and Output Equipment Used in Computing System," Joint AIEE-IRE-ACM Computer Conference, March 1953 (pages 22–31).

Publication II: National Bureau of Standards Report, "System Organization of the Dysseac," by Leiner, August 1953 (pages 10 and 11).

Publication III: "Trends in Computers; Automatic Control and Data Processing," proceedings of the Western Computer Conference, Los Angeles, California, April 1954 (pages 140–154).